J. M. GAUSS.
BATTERY CELL.
APPLICATION FILED APR. 8, 1916.

1,214,669.

Patented Feb. 6, 1917.

Witnesses
David H. Tinkler
Ralph Munden

Inventor
Julius M. Gauss
By Raymond H. Van Vleet
Attorney

UNITED STATES PATENT OFFICE.

JULIUS M. GAUSS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

BATTERY-CELL.

1,214,669.

Specification of Letters Patent.   Patented Feb. 6, 1917.

Application filed April 8, 1916. Serial No. 89,972.

*To all whom it may concern:*

Be it known that I, JULIUS M. GAUSS, a citizen of the United States, residing at Niagara Falls, in the county of Niagara and State of New York, have invented new and useful Improvements in Battery-Cells, of which the following is a specification.

The present invention relates to battery cells.

An object of the present invention is to provide a battery cell of simple construction in which the liability of adding too much liquid is minimized.

A further object is to provide a battery cell so arranged that an attendant may readily determine when the cell has been filled to the desired height, such determination requiring a minimum of discretion on his part.

A further object is to provide a battery cell having a vent for the escape of gases and so arranged that the attendant, by the simple expedient of obstructing said vent while filling the cell, may readily determine when the cell has been filled to the desired height.

A further object is to provide a battery cell having a vent for the escape of gases, said vent being so arranged that bubbles from the electrolyte will drop harmlessly inside the cell.

Other objects will be apparent from the description which follows.

Figure 1:
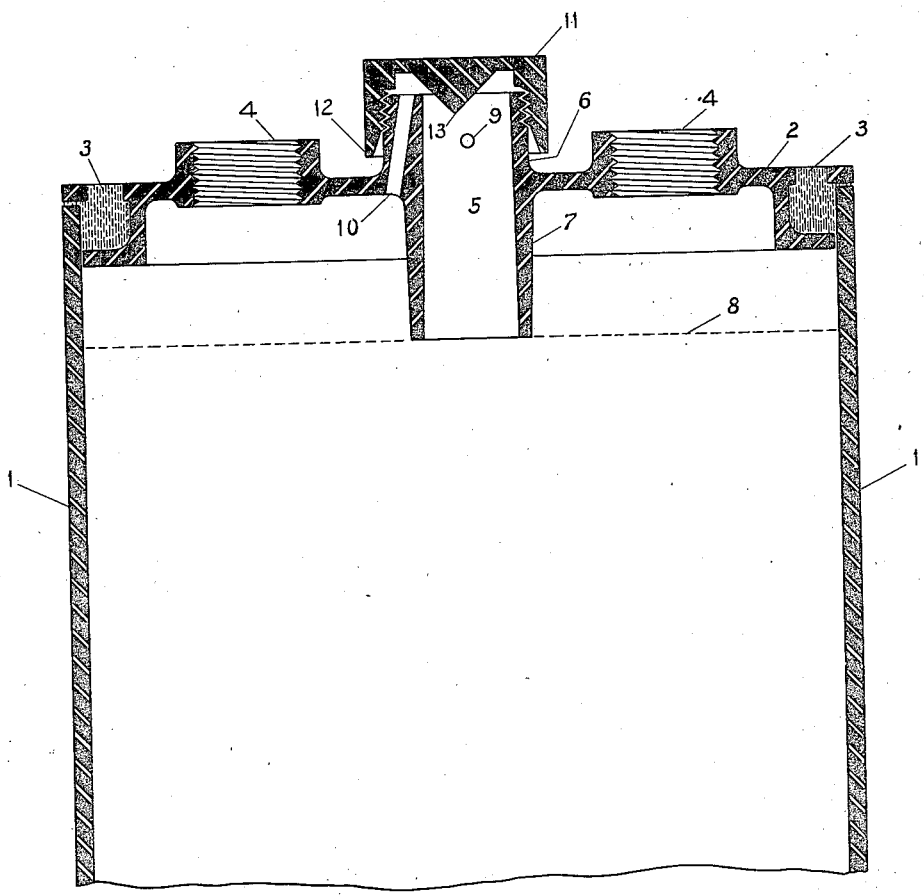
Figure 2:
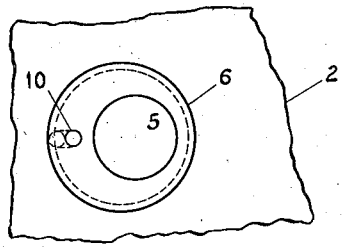

Referring to the drawing, Figure 1 represents in sectional elevation a battery cell embodying the present invention. Fig. 2 represents a plan view of a detail.

The numerals 1, 1, indicate the walls of a battery cell. Said cell is provided with a cover 2, which may be made of hard rubber, or other suitable material. Said cover and walls 1 are tightly sealed, as by a sealing compound 3, making a tight joint all around the cell. Said cover is provided with two apertures 4, 4, through which the cell posts may extend. These apertures are shown as screw-threaded for the reception of bushings for the cell posts.

In the practice of the present invention, the apertures 4 should be tightly sealed by the cell posts and bushings, preferably after the manner disclosed in the application for United States patent of Carpenter and Ellis, No. 89,290 filed April 6, 1916. The manner in which the apertures 4, 4, are closed constitutes no part of the present invention. It is sufficient that they be closed so that no air or gas may pass therethrough, for reasons which will be explained hereinafter. Said cover 2 is also provided with an aperture 5. Surrounding said aperture 5 on the upper side of the cover is a collar 6, externally screw-threaded. Surrounding said aperture on the lower side of the cover is a collar 7. Said collar 7 is designed to extend downwardly to the normal level of the electrolyte, which level is indicated by the broken line 8. The collar 6 is provided with one or more transverse openings 9. The outside of the collar 6 may be eccentric to the aperture 5, providing a thickened portion at one side of the collar, as represented in Fig. 2. Extending through this thickened portion in a direction slightly inclined to the axis of the aperture 5, is a small aperture or vent 10. Mounted on the top of the collar 6, as by screw-threading, is a cap 11, which, as will be noted from the drawing, covers both aperture 5 and vent 10. This cap is provided with a circumferential depending apron portion 12, which lies in front of the openings 9. Said cap is provided on its under portion with a depending cone-shaped portion having an apex or point 13.

In operation, when the attendant desires to fill the cell to the desired level of the electrolyte, he will remove the cap 11 and pour through the aperture 5, meanwhile obstructing the vent 10, as by holding his thumb over the same. The level of the electrolyte will rise until it reaches the bottom of the collar 7. When this level is reached, the electrolyte will suddenly well up within aperture 5, constituting a signal to the attendant that sufficient liquid has been added. As long as the attendant obstructs the vent 10, it will be impossible for him to raise the level of the electrolyte above the level indicated by the broken line 8, which is the normal level of the electrolyte, for the reason that there will be no means for escape of the air in the top of the cell, apertures 4 being tightly closed and the cover being tightly sealed to the walls 1, 1, as explained above.

When the attendant has ceased pouring and has removed the obstruction from aperture 10, the electrolyte will naturally seek its own level. The small amount within collar 7 will raise the electrolyte level only a very inconsiderable amount.

In service gases may escape either through aperture 5 and openings 9 or through aperture 10 and openings 9. By far the greater part of the gases, particularly when the electrolyte is up to its normal level, will escape through the aperture 10. Spray which is thrown up by the gases through aperture 10 will strike against the under side of the cap 11 and will drop off harmlessly from the point 13, back into the cell. Spray thrown up through aperture 5 will also collect upon the point 13 and drop harmlessly into the cell. In case any spray should escape through the opening 9, it will be prevented from spurting by the apron 12, but will fall harmlessly upon the top of the cell, whence it may be collected by any convenient means.

One embodiment of the present invention has been described in detail. Many modifications will occur to those skilled in the art. It is intended in this case to cover all such modifications that fall within the scope of the invention as defined by the appended claims.

Having thus described my invention, what I claim as new and desire to secure by Letters Patent of the United States, is:

1. A battery cell having a cover provided with an aperture, an inwardly projecting collar surrounding said aperture and a second aperture, and a common means for covering without closing said apertures.

2. A battery cell having a cover provided with an aperture, an inwardly projecting collar surrounding said aperture and a second aperture, and shielding means for said apertures, said shielding means being provided with a downwardly projecting liquid dropping point.

3. A battery cell having a cover provided with an aperture and means for preventing the filling of the cell beyond a certain level, said cover being also provided with a vent, the operativeness of said means for the purpose specified being dependent upon the closure of said vent, and means for simultaneously shielding said aperture and vent, said shielding means being provided with a downwardly projecting cone-shaped liquid dropping projection.

4. A battery cover provided with an aperture and a collar surrounding said aperture, said collar being provided with a vent hole extending through said cover.

5. A battery cover provided with an aperture and a collar surrounding said aperture, said collar being provided with a vent hole extending through said cover, and a cap for said collar.

6. A battery cover provided with an aperture and a collar surrounding said aperture, said collar being provided with a vent hole extending through said cover, and a cap for said collar, said cap being provided with a downwardly projecting cone-shaped portion.

7. A battery cell having a cover provided with an aperture and a collar surrounding said aperture, said collar being provided with a vent hole extending through said cover, said cover being also provided with means operative when said vent hole is obstructed, to prevent the filling of the cell beyond a certain level.

8. A battery cell having a cover provided with an aperture and a collar surrounding said aperture, said collar being provided with a vent hole extending through said cover, and a cap for said collar, said cover being also provided with means operative when said vent hole is obstructed, to prevent the filling of the cell beyond a certain level.

9. A battery cell having a cover provided with an aperture and a collar surrounding said aperture, said collar being provided with a vent hole extending through said cover, and a cap for said collar, said cap being provided with a downwardly projecting cone portion, said cover being also provided with means operative when said vent hole is obstructed, to prevent the filling of the cell beyond a certain level.

10. A cell cover provided with an aperture, a downwardly projecting collar surrounding said aperture, said cover being provided with a vent hole extending therethrough adjacent said aperture, and a single cap shielding said aperture and said vent hole.

11. A cell cover provided with an aperture and a collar on each side of said cover surrounding said aperture, one of said collars being provided with a vent hole extending through said cover.

12. A cell cover provided with an aperture and a collar on each side of said cover surrounding said aperture, one of said collars being provided with a vent hole extending through said cover, and a cap for said collar.

13. A cell cover provided with an aperture and a collar on each side of said cover surrounding said aperture, one of said collars being provided with a vent hole extending through said cover, and a cap for said collar, said cap being provided with a downwardly projecting cone-shaped portion.

14. A cell cover provided with an aperture, a downwardly projecting collar surrounding said aperture, said cover being provided with a vent hole extending therethrough adjacent said aperture, and a single cap shielding said aperture and said vent hole, said cap being provided with a downwardly projecting cone-shaped portion.

15. A cell cover provided with a collar on each of its sides, said cover being provided with an aperture extending through and surrounded by said collars, one of said collars being eccentric relative to said aperture whereby to provide a thickened portion, said thickened portion being provided with a vent hole extending through said cover.

16. A cell cover provided with a collar on each of its sides, said cover being provided with an aperture extending through and surrounded by said collars, one of said collars being eccentric relative to said aperture whereby to provide a thickened portion, said thickened portion being provided with a vent hole extending through said cover, and a cap for shielding said aperture and said vent hole.

17. A cell cover provided with a collar on each of its sides, said cover being provided with an aperture extending through and surrounded by said collars, one of said collars being eccentric relative to said aperture whereby to provide a thickened portion, said thickened portion being provided with a vent hole extending through said cover, and a cap for shielding said aperture and said vent hole, said cap being provided with a depending cone-shaped portion.

18. A cell cover provided with a collar on each of its sides, said cover being provided with an aperture extending through and surrounded by said collars, one of said collars being eccentric relative to said aperture whereby to provide a thickened portion, said thickened portion being provided with a vent hole extending through said cover, and a cap for shielding said aperture and said vent hole, said last mentioned collar being provided with a transverse opening and said cap being provided with an apron portion for shielding said opening.

In witness whereof, I have hereunto subscribed my name.

JULIUS M. GAUSS.